(12) United States Patent
Sun et al.

(10) Patent No.: US 11,082,187 B2
(45) Date of Patent: Aug. 3, 2021

(54) RATE-MATCHING FOR SINGLE DOWNLINK CONTROL INFORMATION MULTI-TRANSMISSION RECEPTION POINT TRANSMISSIONS

(71) Applicant: QUALCOMM Incorporated, San Diego, CA (US)

(72) Inventors: Jing Sun, San Diego, CA (US); Xiaoxia Zhang, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 16/366,430

(22) Filed: Mar. 27, 2019

(65) Prior Publication Data

US 2019/0319767 A1 Oct. 17, 2019

Related U.S. Application Data

(60) Provisional application No. 62/656,828, filed on Apr. 12, 2018.

(51) Int. Cl.
*H04L 5/00* (2006.01)
*H04L 1/00* (2006.01)
*H04W 72/04* (2009.01)

(52) U.S. Cl.
CPC .......... *H04L 5/0055* (2013.01); *H04L 1/0003* (2013.01); *H04L 5/0035* (2013.01); *H04W 72/042* (2013.01)

(58) Field of Classification Search
CPC ... H04L 5/0055; H04L 1/0003; H04L 5/0035; H04W 72/042

USPC .......................................................... 370/329
See application file for complete search history.

(56) References Cited

U.S. PATENT DOCUMENTS

| | | | |
|---|---|---|---|
| 2009/0300456 A1* | 12/2009 | Pelletier | H04L 1/1822 714/749 |
| 2013/0039349 A1* | 2/2013 | Ebrahimi Tazeh Mahalleh | H04B 7/024 370/336 |
| 2013/0308504 A1* | 11/2013 | Nimbalker | H04L 5/003 370/281 |

(Continued)

OTHER PUBLICATIONS

International Search Report and Written Opinion—PCT/US2019/024697—ISA/EPO—dated Sep. 3, 2019.

(Continued)

*Primary Examiner* — Christopher R Crompton
(74) *Attorney, Agent, or Firm* — Patterson + Sheridan, LLP

(57) ABSTRACT

Certain aspects of the present disclosure provide techniques for rate-matching data on a per transmission reception point (TRP) basis for single downlink control information (DCI) multi-TRP transmissions. Transmitters operating according to the present disclosure use a per TRP rate matching technique in which the rate-matching order is to first rate-match across spatial layers transmitted by a TRP, then across frequency, then across time, and then to another TRP, where remaining data is rate-matched across the spatial layers of that other TRP, then across frequency, and then across time. The described per TRP rate-matching technique causes code blocks of a transport block to be transmitted by one TRP, instead of each code block being transmitted by a group of TRPs.

29 Claims, 13 Drawing Sheets

(56) References Cited

U.S. PATENT DOCUMENTS

| | | | |
|---|---|---|---|
| 2015/0181590 A1* | 6/2015 | Park | H04L 1/1812 370/280 |
| 2018/0324688 A1* | 11/2018 | Li | H04W 72/0453 |
| 2019/0140784 A1* | 5/2019 | Xi | H03M 13/373 |
| 2020/0228250 A1* | 7/2020 | Cheng | H04L 1/1819 |

OTHER PUBLICATIONS

Mediatek Inc: "Codeword Mapping in NR", 3GPP Draft; R1-1713688 Layer Mapping Final, 3rd Generation Partnership Project (3GPP), Mobile Competence Centre, 650, Route Des Lucioles ; F-06921 Sophia-Antipolis Cedex, France, vol. RAN WG1, No. Prague, Czech Republic; Aug. 21, 2017-Aug. 25, 2017, Aug. 20, 2017 (Aug. 20, 2017), pp. 1-15, XP051316488, Retrieved from the Internet: URL: http://www.3gpp.org/ftp/Meetings_3GPP_SYNC/RAN1/Docs/ [retrieved on Aug. 20, 2017], Section 2.1.

Partial International Search Report—PCT/US2019/024697—ISA/EPO—dated Jul. 12, 2019.

\* cited by examiner

RATE-MATCHING FOR SINGLE DOWNLINK CONTROL INFORMATION MULTI-TRANSMISSION RECEPTION POINT TRANSMISSIONS

CROSS-REFERENCE TO RELATED APPLICATIONS

The present Application for Patent claims benefit of and priority to U.S. Provisional Patent Application No. 62/656,828, filed Apr. 12, 2018, which is assigned to the assignee hereof and hereby expressly incorporated by reference herein in its entirety as if fully set forth below and for all applicable purposes.

INTRODUCTION

Field of the Disclosure

Aspects of the present disclosure relate to wireless communications, and more particularly, to techniques for rate-matching data on a per transmission reception point (TRP) basis for single downlink control information (DCI) multi-TRP transmissions.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications performed by a transmitter. The method generally includes obtaining a set of bits of a transport block (TB) to be sent as a multi-layer transmission to a receiver, wherein the TB includes a first set of one or more code blocks (CBs) and a second set of one or more CBs; segmenting the set of bits of the TB to form the first set of CBs and the second set of CBs; encoding the first set of CBs and the second set of CBs; obtaining a first set of layers of the multi-layer transmission and a second set of layers of the multi-layer transmission, wherein the first set of layers of the multi-layer transmission is transmitted from a first transmission-reception point (TRP) and the second set of layers of the multi-layer transmission is transmitted from a second TRP; rate-matching the encoded bits of the first set of CBs to a set of resource blocks (RBs) allocated over the first set of layers of the multi-layer transmission; rate-matching the encoded bits of the second set of CBs to the set of RBs allocated over the second set of layers of the multi-layer transmission; transmitting, via the first TRP, the first set of CBs to the receiver in the first set of layers via the set of RBs; and transmitting, via the second TRP, the second set of CBs to the receiver in the second set of layers via the set of RBs.

Certain aspects provide a method for wireless communications performed by a transmitter. The method generally includes obtaining a set of bits of a transport block (TB) to be sent as a multi-layer transmission to a set of one or more receivers, wherein the TB includes a first set of one or more code blocks (CBs) and a second set of one or more CBs; segmenting the set of bits of the TB to form the first set of CBs and the second set of CBs; encoding the first set of CBs and the second set of CBs; obtaining a first set of layers of the multi-layer transmission and a second set of layers of the multi-layer transmission, wherein the first set of layers of the multi-layer transmission and the second set of layers of the multi-layer transmission are transmitted from a transmission-reception point (TRP); rate-matching the encoded bits of the first set of CBs to a set of resource blocks (RBs) allocated over the first set of layers of the multi-layer transmission; rate-matching the encoded bits of the second set of CBs to the set of RBs allocated over the second set of layers of the multi-layer transmission; transmitting, via the TRP and to a first receiver in the set of receivers, the first set of CBs in the first set of layers of the multi-layer transmission via the set of RBs; and transmitting, via the TRP and to the first receiver or a second receiver in the set of receivers, the second set of CBs in the second set of layers of the multi-layer transmission via the set of RBs.

Certain aspects provide a method for wireless communications performed by a receiver. The method generally includes receiving, from a first transmission reception point (TRP), one first set of code blocks (CBs) of one or more CBs in at least one first set of layers of a first multi-layer transmission; receiving, from a second TRP, one second set of CBs of one or more CBs in one second set of layers of the first multi-layer transmission; and combining the first set of CBs and the second set of CBs to form a single transport block (TB).

Certain aspects provide an apparatus for wireless communications. The apparatus generally includes a processor configured to obtain a set of bits of a transport block (TB) to be sent as a multi-layer transmission to a receiver, wherein the TB includes a first set of one or more code blocks (CBs) and a second set of one or more CBs; to segment the set of bits of the TB to form the first set of CBs and the second set of CBs; to encode the first set of CBs and the second set of CBs; to obtain a first set of layers of the multi-layer transmission and a second set of layers of the multi-layer transmission, wherein the first set of layers of the multi-layer transmission is transmitted from a first transmission-reception point (TRP) and the second set of layers of the multi-layer transmission is transmitted from a second TRP; to rate-match the encoded bits of the first set of CBs to a set of resource blocks (RBs) allocated over the first set of layers of the multi-layer transmission; to rate-match the encoded bits of the second set of CBs to the set of RBs allocated over the second set of layers of the multi-layer transmission; to transmit, via the first TRP, the first set of CBs to the receiver in the first set of layers via the set of RBs; and to transmit, via the second TRP, the second set of CBs to the receiver in the second set of layers via the set of RBs; and a memory coupled with the processor.

Certain aspects provide an apparatus for wireless communications. The apparatus generally includes a processor configured to obtain a set of bits of a transport block (TB) to be sent as a multi-layer transmission to a set of one or more receivers, wherein the TB includes a first set of one or more code blocks (CBs) and a second set of one or more CBs; to segment the set of bits of the TB to form the first set of CBs and the second set of CBs; to encode the first set of CBs and the second set of CBs; to obtain a first set of layers of the multi-layer transmission and a second set of layers of the multi-layer transmission, wherein the first set of layers of the multi-layer transmission and the second set of layers of the multi-layer transmission are transmitted from a transmission-reception point (TRP); to rate-match the encoded bits of the first set of CBs to a set of resource blocks (RBs) allocated over the first set of layers of the multi-layer transmission; to rate-match the encoded bits of the second set of CBs to the set of RBs allocated over the second set of layers of the multi-layer transmission; to transmit, via the TRP and to a first receiver in the set of receivers, the first set of CBs in the first set of layers of the multi-layer transmission via the set of RBs; and to transmit, via the TRP and to the first receiver or a second receiver in the set of receivers, the second set of CBs in the second set of layers of the multi-layer transmission via the set of RBs; and a memory coupled with the processor.

Certain aspects provide an apparatus for wireless communications. The apparatus generally includes a processor configured to receive, from a first transmission reception point (TRP), one first set of code blocks (CBs) of one or more CBs in at least one first set of layers of a first multi-layer transmission; to receive, from a second TRP, one second set of CBs of one or more CBs in one second set of layers of the first multi-layer transmission; and to combine the first set of CBs and the second set of CBs to form a single transport block (TB); and a memory coupled with the processor.

Certain aspects provide an apparatus for wireless communications. The apparatus generally includes means for obtaining a set of bits of a transport block (TB) to be sent as a multi-layer transmission to a receiver, wherein the TB includes a first set of one or more code blocks (CBs) and a second set of one or more CBs; means for segmenting the set of bits of the TB to form the first set of CBs and the second set of CBs; means for encoding the first set of CBs and the second set of CBs; means for obtaining a first set of layers of the multi-layer transmission and a second set of layers of the multi-layer transmission, wherein the first set of layers of the multi-layer transmission is transmitted from a first transmission-reception point (TRP) and the second set of layers of the multi-layer transmission is transmitted from a second TRP; means for rate-matching the encoded bits of the first set of CBs to a set of resource blocks (RBs) allocated over the first set of layers of the multi-layer transmission; means for rate-matching the encoded bits of the second set of CBs to the set of RBs allocated over the second set of layers of the multi-layer transmission; means for transmitting, via the first TRP, the first set of CBs to the receiver in the first set of layers via the set of RBs; and means for transmitting, via the second TRP, the second set of CBs to the receiver in the second set of layers via the set of RBs.

Certain aspects provide an apparatus for wireless communications. The apparatus generally includes means for obtaining a set of bits of a transport block (TB) to be sent as a multi-layer transmission to a set of one or more receivers, wherein the TB includes a first set of one or more code blocks (CBs) and a second set of one or more CBs; means for segmenting the set of bits of the TB to form the first set of CBs and the second set of CBs; means for encoding the first set of CBs and the second set of CBs; obtaining a first set of layers of the multi-layer transmission and a second set of layers of the multi-layer transmission, wherein the first set of layers of the multi-layer transmission and the second set of layers of the multi-layer transmission are transmitted from a transmission-reception point (TRP); means for rate-matching the encoded bits of the first set of CBs to a set of resource blocks (RBs) allocated over the first set of layers of the multi-layer transmission; means for rate-matching the encoded bits of the second set of CBs to the set of RBs allocated over the second set of layers of the multi-layer transmission; means for transmitting, via the TRP and to a first receiver in the set of receivers, the first set of CBs in the first set of layers of the multi-layer transmission via the set of RBs; and means for transmitting, via the TRP and to the first receiver or a second receiver in the set of receivers, the second set of CBs in the second set of layers of the multi-layer transmission via the set of RBs.

Certain aspects provide an apparatus for wireless communications. The apparatus generally includes means for receiving, from a first transmission reception point (TRP), one first set of code blocks (CBs) of one or more CBs in at least one first set of layers of a first multi-layer transmission; means for receiving, from a second TRP, one second set of CBs of one or more CBs in one second set of layers of the first multi-layer transmission; and means for combining the first set of CBs and the second set of CBs to form a single transport block (TB).

Certain aspects provide a computer-readable medium for wireless communications. The computer-readable medium includes instructions that, when executed by a processor, cause the processor to execute operations generally including obtaining a set of bits of a transport block (TB) to be sent as a multi-layer transmission to a receiver, wherein the TB includes a first set of one or more code blocks (CBs) and a second set of one or more CBs; segmenting the set of bits of the TB to form the first set of CBs and the second set of CBs; encoding the first set of CBs and the second set of CBs; obtaining a first set of layers of the multi-layer transmission and a second set of layers of the multi-layer transmission, wherein the first set of layers of the multi-layer transmission is transmitted from a first transmission-reception point (TRP) and the second set of layers of the multi-layer transmission is transmitted from a second TRP; rate-matching the encoded bits of the first set of CBs to a set of resource blocks (RBs) allocated over the first set of layers of the multi-layer transmission; rate-matching the encoded bits of the second set of CBs to the set of RBs allocated over the second set of layers of the multi-layer transmission; transmitting, via the first TRP, the first set of CBs to the receiver in the first set of layers via the set of RBs; and transmitting, via the second TRP, the second set of CBs to the receiver in the second set of layers via the set of RBs.

Certain aspects provide a computer-readable medium for wireless communications. The computer-readable medium includes instructions that, when executed by a processor, cause the processor to execute operations generally including obtaining a set of bits of a transport block (TB) to be sent as a multi-layer transmission to a set of one or more receivers, wherein the TB includes a first set of one or more code blocks (CBs) and a second set of one or more CBs; segmenting the set of bits of the TB to form the first set of CBs and the second set of CBs; encoding the first set of CBs and the second set of CBs; obtaining a first set of layers of the multi-layer transmission and a second set of layers of the multi-layer transmission, wherein the first set of layers of the multi-layer transmission and the second set of layers of the multi-layer transmission are transmitted from a transmission-reception point (TRP); rate-matching the encoded bits of the first set of CBs to a set of resource blocks (RBs) allocated over the first set of layers of the multi-layer transmission; rate-matching the encoded bits of the second set of CBs to the set of RBs allocated over the second set of layers of the multi-layer transmission; transmitting, via the TRP and to a first receiver in the set of receivers, the first set of CBs in the first set of layers of the multi-layer transmission via the set of RBs; and transmitting, via the TRP and to the first receiver or a second receiver in the set of receivers, the second set of CBs in the second set of layers of the multi-layer transmission via the set of RBs.

Certain aspects provide a computer-readable medium for wireless communications. The computer-readable medium includes instructions that, when executed by a processor, cause the processor to execute operations generally including receiving, from a first transmission reception point (TRP), one first set of code blocks (CBs) of one or more CBs in at least one first set of layers of a first multi-layer transmission; receiving, from a second TRP, one second set of CBs of one or more CBs in one second set of layers of the first multi-layer transmission; and combining the first set of CBs and the second set of CBs to form a single transport block (TB).

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
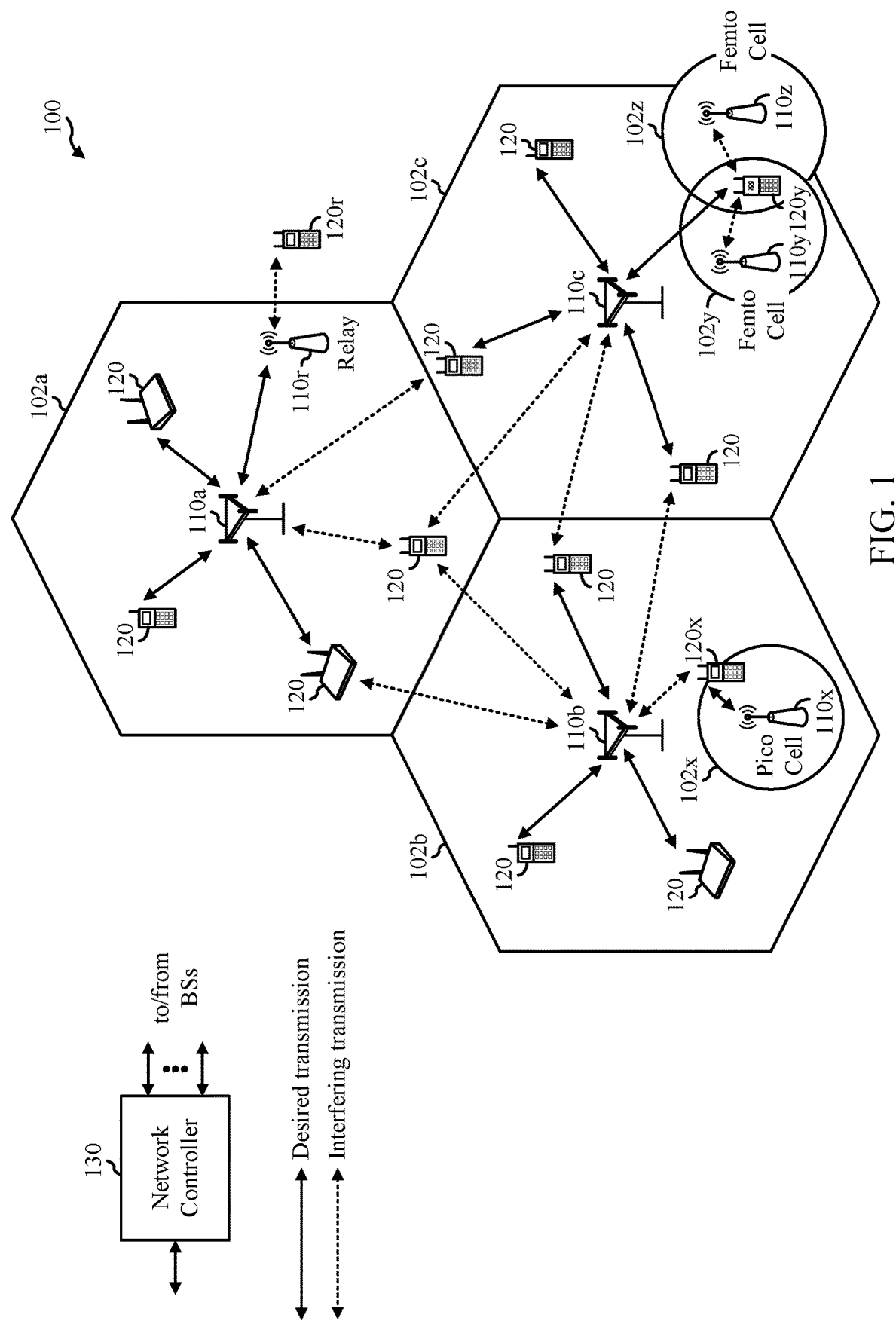
FIG. 1 is a block diagram conceptually illustrating an example telecommunications system, in accordance with certain aspects of the present disclosure.

Aspects of the present disclosure provide apparatus, methods, processing systems, and computer readable mediums for rate-matching data on a per transmission reception point (TRP) basis for single downlink control information (DCI) multi-TRP transmissions. That is, the present disclosure describes techniques for rate-matching data for multi-TRP transmissions (i.e., from multiple TRPs) on a per-TRP basis, wherein each multi-TRP transmission is scheduled by a single DCI.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. Each of the base stations 110 and the UEs 120 may perform the operations described below with reference to FIG. 10.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
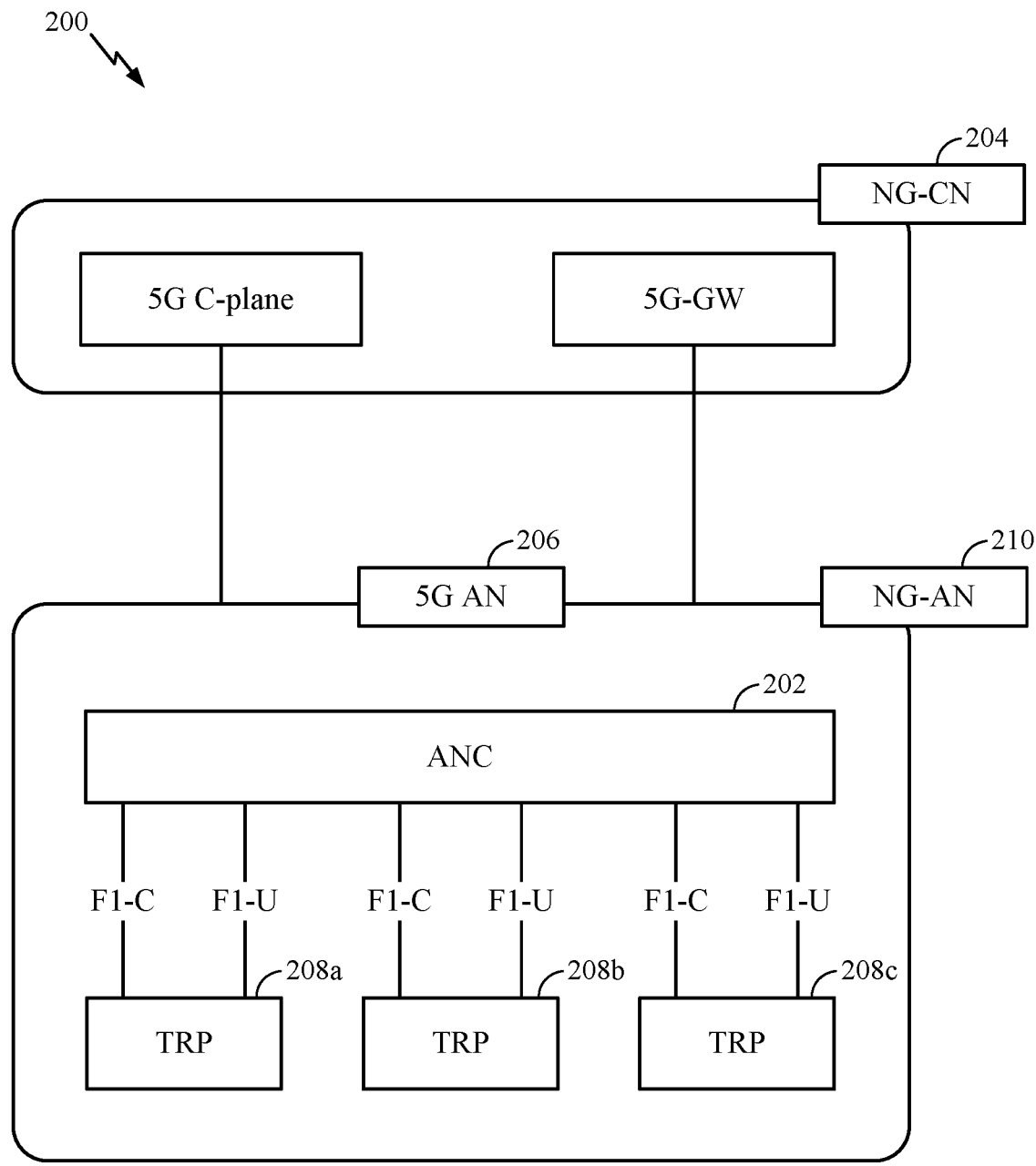
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
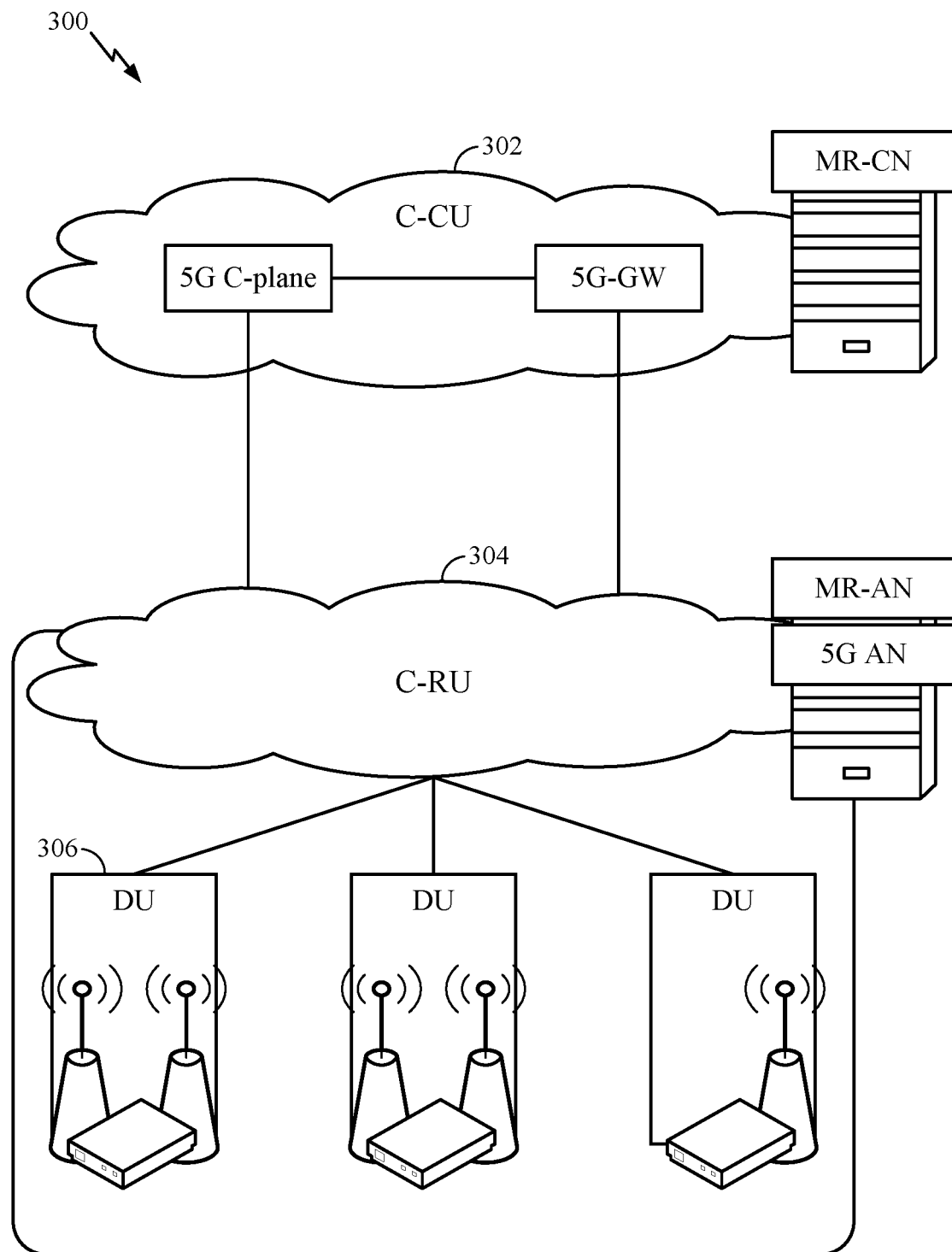
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
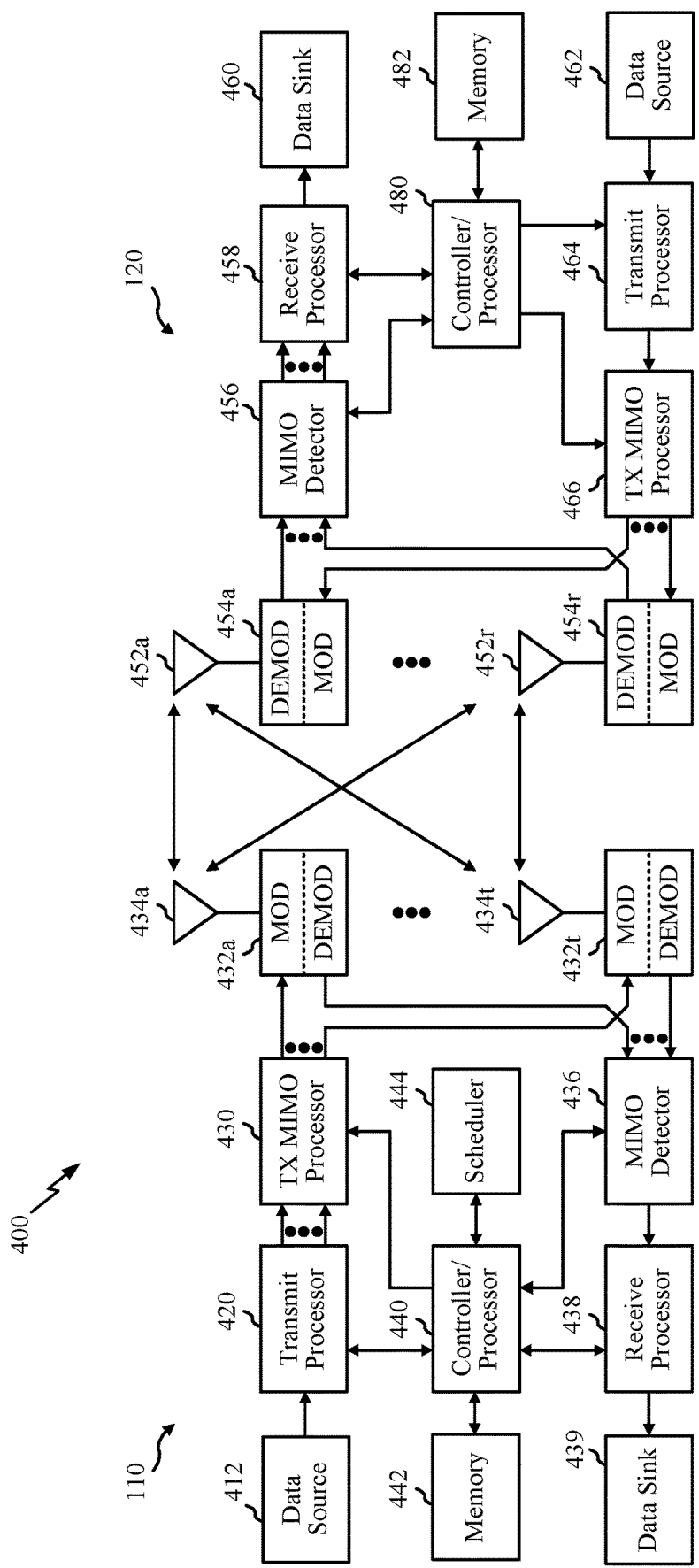
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described below with reference to FIG. 10.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
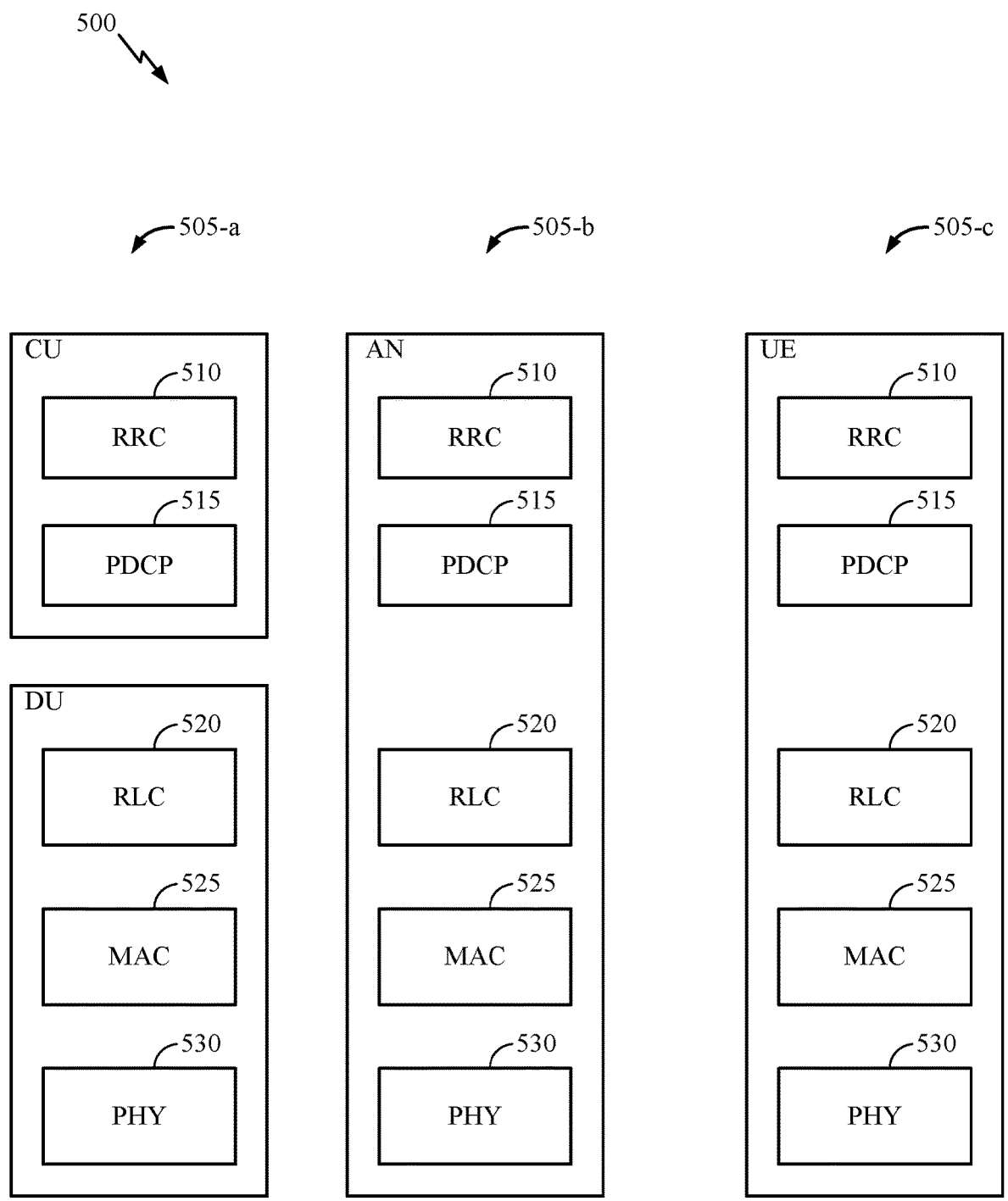
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
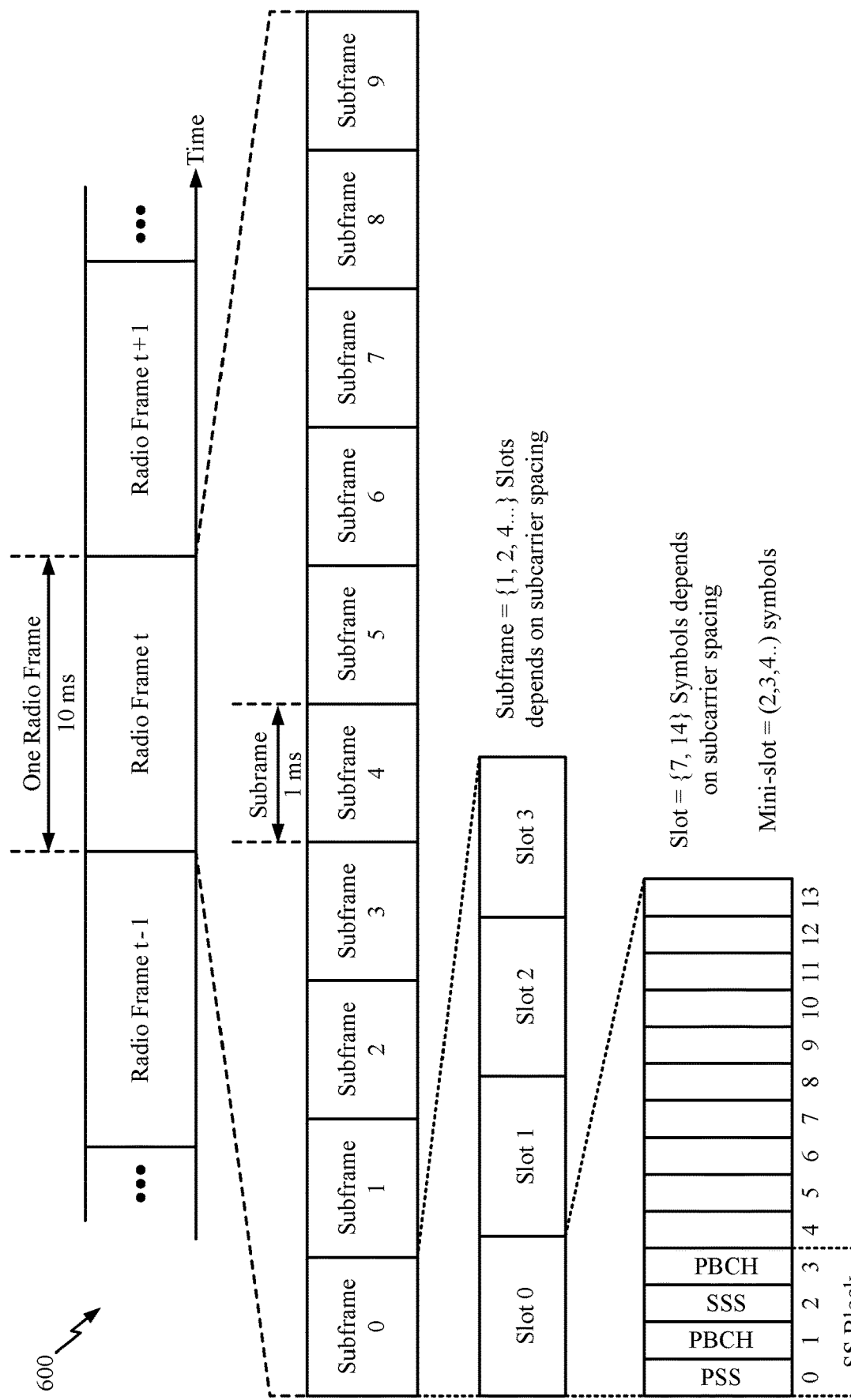
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 10. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within a radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Rate-Matching for Single Downlink Control Information Multi-Transmission Reception Point Transmissions In previously known techniques (e.g., NR) for multi-TRP transmissions, the following two modes are supported for downlink (DL) transmissions.

Mode 1: A single downlink control information (DCI) conveys an allocation of transmission resources (e.g., RBs) for a single transport block (TB) to be transmitted, and spatial layers in the TB are transmitted from two TRPs (e.g., TRPs 208, shown in FIG. 2), with each spatial layer transmitted by one TRP.

Mode 2: Multiple DCIs each grant resources for one TB, and each TB is transmitted from one TRP.

When performing the above described mode 1 multi-TRP transmissions, an NR system rate-matches the data of the TB across spatial layers first, across frequencies (of the allocated RBs) second, and across time (i.e., symbol periods of the allocated RBs) third. As a result of this rate-matching order, for mode 1, each code block (CB) of the TB will be transmitted from both TRPs.

Figure 7:
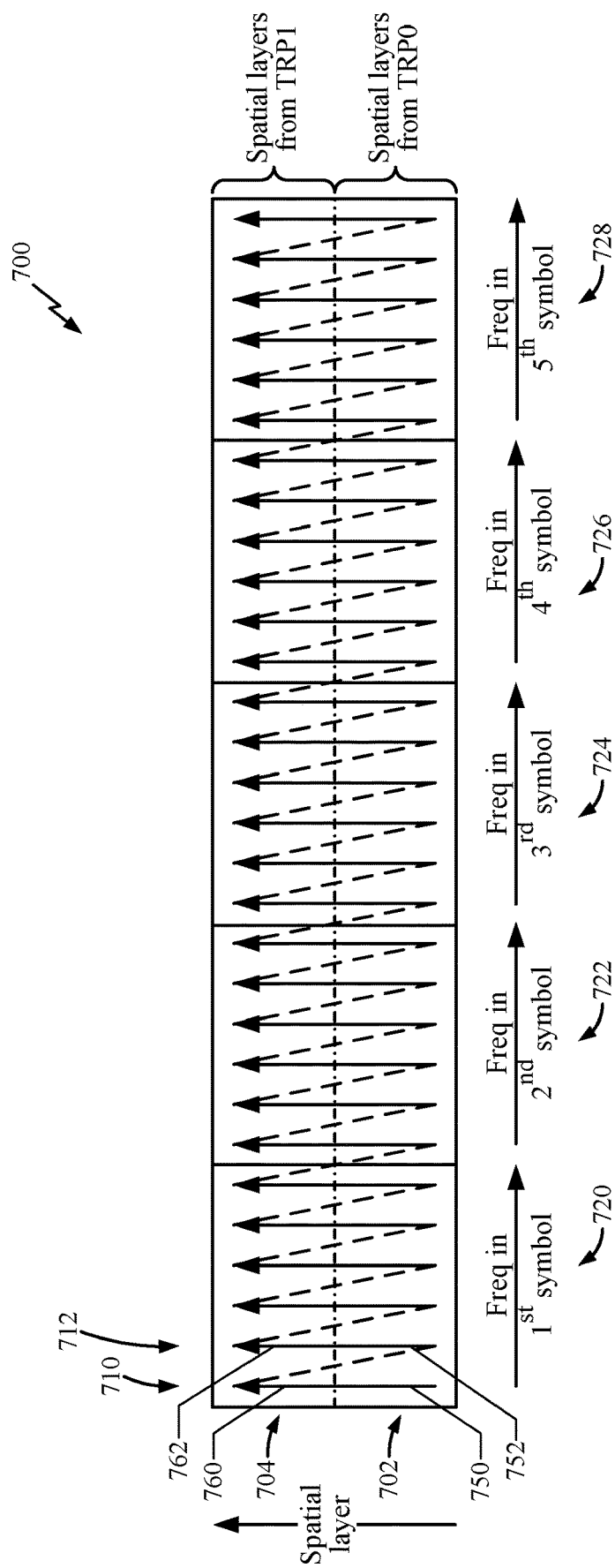
FIG. 7 shows an exemplary time, layer, and frequency resource map, according to previously known techniques.

FIG. 7 shows an exemplary time, layer, and frequency resource map 700 that illustrates an example of rate-matching for a mode 1 multi-TRP transmission, according to previously known techniques. In the example map, each of the solid arrows indicates mapping of data to a frequency, as at 710 and 712. Each symbol (e.g., symbols 720, 722, 724, 726, and 728) is shown with several solid arrows, to indicate mapping of the data to the frequencies in each individual symbol. In the example map, data of a TB are mapped to transmission resources for transmission by two TRPs, TRP0 and TRP1. As shown, data from the TB is rate-matched at 750 to the first layer(s) 702 (for transmission by TRP0) of the transmission on a frequency 710 in the first symbol 720. The next data of the TB are rate-matched at 760 to the second layer(s) 704 (for transmission by TRP1) of the transmission on the frequency 710 in the first symbol. The next data of the TB are rate-matched at 752 to the first layer(s) on a frequency 712 in the first symbol. Then, the next data of the TB are rate-matched at 762 to the second layer(s) on frequency 712. The data of the TB are rate-matched across spatial layers first and frequency second in the first symbol until all of the resources of the first symbol have data assigned, at which point the rate-matching moves on to the resources of the second symbol 722. Thus, by rate-matching across spatial layers first, frequencies second, and time third, the previously known technique causes portions of each code block (CB) of the TB to be transmitted by each TRP.

According to aspects of the present disclosure, techniques for rate-matching for a multi-TRP transmission in NR communications systems are provided.

In aspects of the present disclosure, a per TRP rate matching technique is described, in which the rate-matching order is to first rate-match across spatial layers transmitted by a TRP, then across frequency, then across time, and then to another TRP, where remaining data is rate-matched across the spatial layers transmitted by that other TRP, then across frequency, and then across time.

According to aspects of the present disclosure, during rate-matching for a multi-TRP transmission, the rate-matching process may enforce a rule that data from a CB is not rate-matched across the TRP boundary. That is, during the rate-matching process, a transmitter (e.g., a TRP) may determine a number of bits that can be rate-matched on a number of layers in an allocation of transmission resources (e.g., RBs), and then obtain (e.g., by requesting that number of bits from a MAC layer of a protocol stack of the transmitter) that number of bits and rate-match that number of bits to the layers on the allocated resources. The transmitter may determine and obtain the number of bits for each set of layers being transmitted by the transmitter, and thus ensure that each CB is not rate-matched across a TRP boundary (e.g., rate-matched to be transmitted by multiple TRPs).

Figure 8:
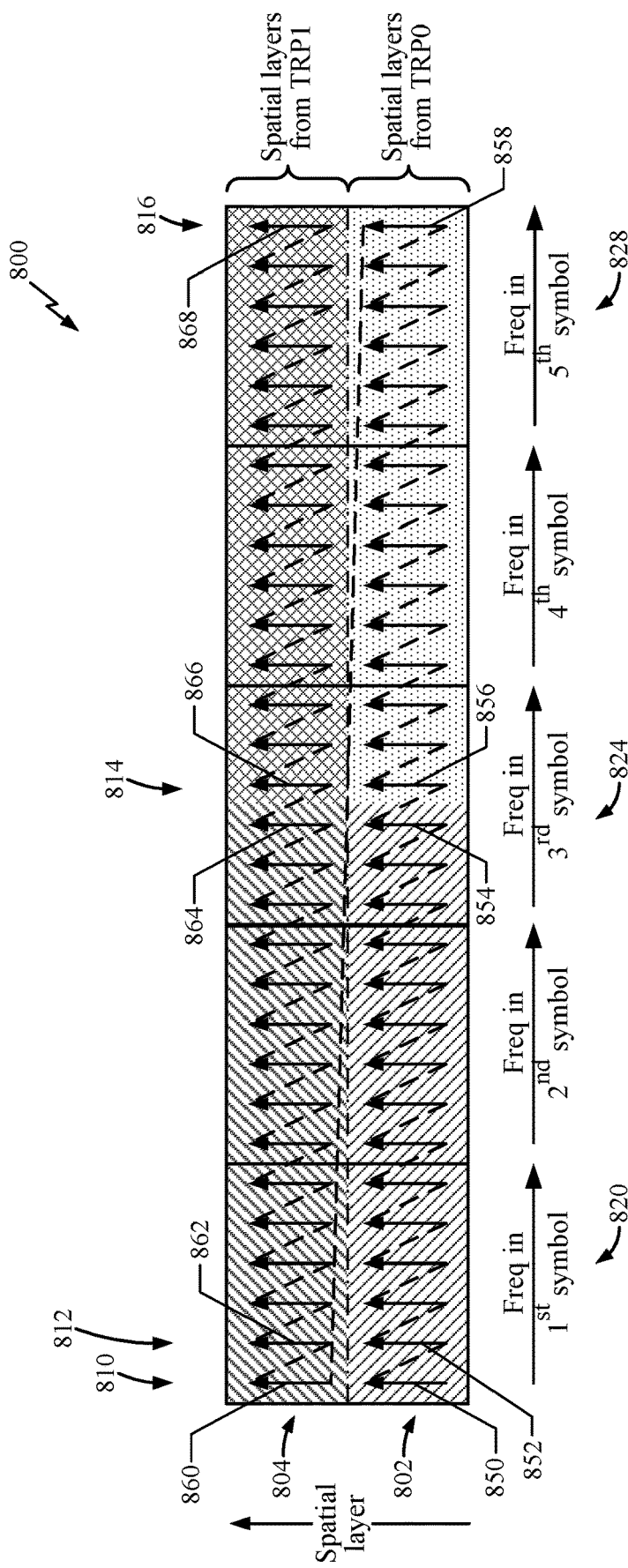
FIG. 8 shows an exemplary time, layer, and frequency resource map, according to aspects of the present disclosure.

FIG. 8 shows an exemplary time, layer, and frequency resource map 800 that illustrates an example of rate-matching for a multi-TRP transmission, according to aspects of the present disclosure. In the example map, data of a TB are mapped to transmission resources for transmission by two TRPs, TRP0 and TRP1. As shown, data from a first CB of the TB is rate-matched at 850 to the first layer(s) 802 (for transmission by TRP0) of the transmission on a frequency 810 in the first symbol 820. The next data of the TB are rate-matched at 852 to the first layer(s) (for transmission by TRP0) of the transmission on the frequency 812 in the first symbol. The rate-matching of the data of the first CB to the first layer(s) of the transmission continues, and the entire first CB of the TB has been rate-matched to the first layer(s) of the transmission at 854. At 856, rate-matching of a second CB of the TB begins with the data of the second CB being rate-matched to the first layer(s) on a frequency 814 in the third symbol 824. The entire second CB is rate-matched to the first layer(s) at 858 on a frequency 816 in the fifth symbol 828. The transmitter determines that there are insufficient time and frequency resources remaining in the first layer(s) for transmission of the third CB of the TB, so the data of the third CB are rate-matched at 860 to the second layer(s) on the frequency 810 in the first symbol. Then, the next data of the third CB are rate-matched at 862 to the second layer(s) on frequency 812. The rate-matching of the data of the third CB to the second layer(s) of the transmission continues, and the entire third CB of the TB has been rate-matched to the second layer(s) of the transmission at 864. At 866, rate-matching of a fourth CB of the TB begins with the data of the fourth CB being rate-matched to the second layer(s) on the frequency 814 in the third symbol 824. The entire fourth CB is rate-matched to the second layer(s) at 868 on the frequency 816 in the fifth symbol 828. Thus, by rate-matching across spatial layers transmitted by a TRP first, frequencies second, time third, and then to another TRP, the disclosed technique causes each code block of the TB to be transmitted by only a single TRP.

According to previously known techniques, TRPs transmitting a single TB in a multi-TRP transmission in the baseline NR design require a tight coordination between the TRPs. In the previously known techniques, the same TB is delivered to two TRPs, and for each CB, part of the coded bits is transmitted by a first TRP and another part is transmitted by a second TRP. Alternatively, a central unit (e.g., AN 206 or CN 204, shown in FIG. 2) can maintain the TB and deliver coded bits to be transmitted in spatial layers to each of the TRPs. When a central unit maintains the TB and delivers coded bits to TRPs for transmission, the central unit rate-matches the coded bits such that each TRP transmits part of each CB, as described above with reference to FIG. 7.

In aspects of the present disclosure, the coordination requirement between the TRPs may be less stringent than in previously known techniques.

According to aspects of the present disclosure, each TRP (e.g., a TRP of a base station (BS) serving a user equipment (UE)) can request a different sub-TB (e.g., a code block) from the MAC layer of a protocol stack in the TRP, independently of activities of any other TRP, as long as the size of the sub-TB is known.

In aspects of the present disclosure, a TRP or other network entity can compute a sub-TB size for each sub-TB for each TRP, based on a resource block allocation, modulation and coding scheme (MCS), and rank for each TRP. The TRP or other network entity can then request that sub-TB size number of bits from the MAC layer of the protocol stack and transmit the (sub-TB-sized or smaller) group of bits obtained from the MAC layer.

According to aspects of the present disclosure, CB segmentation can be done for each sub-TB. That is, each TRP can independently segment each sub-TB sized group of bits into CBs. The TRPs then coordinate the transmission (e.g., a scheduling decision), but not the contents to be transmitted.

In aspects of the present disclosure, each TRP coordinating to perform a multi-TRP transmission may transmit using a different modulation order than the other TRPs transmitting the multi-TRP transmission.

According to aspects of the present disclosure, TRPs using different modulation orders when coordinating to transmit a multi-TRP transmission may improve transmission performance (e.g., by improving a data throughput rate or decreasing an error rate) versus previously known multi-TRP transmission techniques, as a signal-to-noise ratio (SNR) difference between two TRPs can be large (e.g., larger than an SNR difference between different spatial layers transmitted from a same TRP).

In aspects of the present disclosure, downlink control information (DCI) may be used to indicate to a receiver a total rank for a multi-TRP transmission. Some limited combinations of ranks (e.g., the rank of a first TRP can differ from the rank of a second TRP by at most 1) of the transmissions by each TRP may be supported, as is done in LTE further enhancements to coordinated multi-point (feCoMP) transmissions.

According to aspects of the present disclosure, larger rank differences (e.g., larger than 1) between the TRPs transmitting a multi-TRP transmission may be supported.

In aspects of the present disclosure, an additional DCI field or a previously known DCI field that has been altered may indicate the specific rank of the transmission by each TRP involved in transmitting the multi-TRP transmission.

According to aspects of the present disclosure, for a retransmission, a CB may be switched (e.g., swapped) between TRPs. If all (e.g., both) TRPs have full TB information for a multi-TRP transmission, then, for a retransmission, a CB needing to be retransmitted may be switched to being transmitted by a TRP that did not originally transmit that CB. This may improve performance of multi-TRP transmissions in situations in which the TRPs experience different SNRs to a receiver. Switching the retransmitted CB to another TRP may help to normalize the SNR for each CB.

In aspects of the present disclosure, switching CBs between TRPs may be difficult if the rank and modulation order of the two TRPs are not similar.

According to aspects of the present disclosure, a network device can determine, based on a rank and modulation order of transmissions from two or more TRPs to a receiver, whether to switch CBs between the TRPs for retransmission.

In aspects of the present disclosure, a transmitter (e.g., an AN or a TRP) may transmit an indication of switching (e.g., swapping) of CBs between TRPs when the transmitter switches CBs between TRPs for a retransmission. The indication of the switching may be transmitted in a DCI and/or a redundancy version (RV) identifier (RVID) of the transmission.

Figure 9:
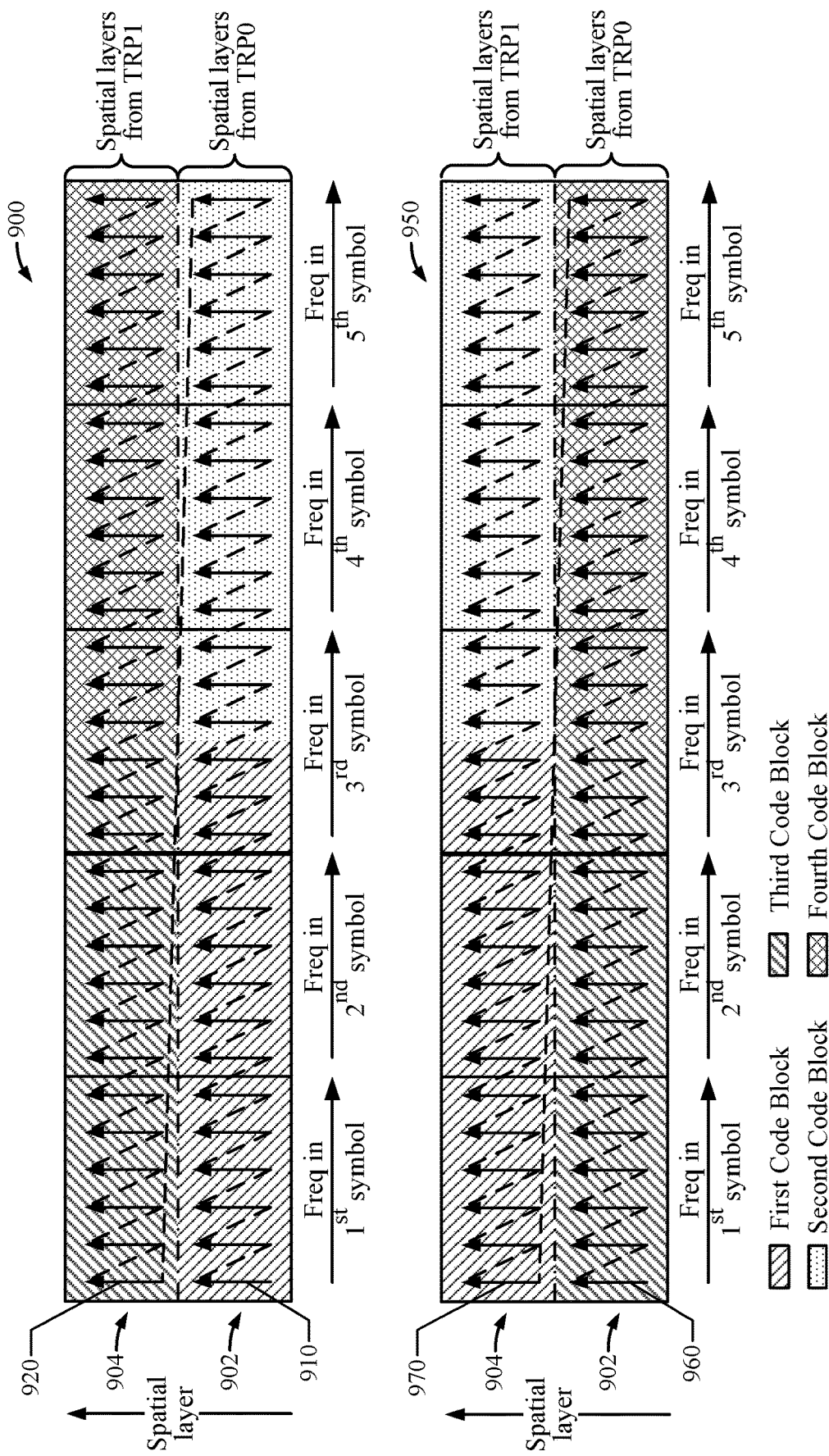
FIG. 9 shows exemplary time, layer, and frequency resource maps, according to aspects of the present disclosure.

FIG. 9 shows exemplary time, layer, and frequency resource maps 900 and 950 that illustrate an example of switching of CBs for a multi-TRP transmission, according to aspects of the present disclosure. In the example map 900, data of a TB are mapped to transmission resources for transmission by two TRPs, TRP0 and TRP1. As shown, data from a first CB and a second CB of the TB are rate-matched, beginning at 910, to the first layer(s) 902 (for transmission by TRP0) of the transmission. Data from a third CB and a fourth CB of the TB are rate-matched, beginning at 920, to the second layers 904 (for transmission by TRP1) of the transmission. The example map 950 shows rate-matching for an exemplary retransmission in which the CBs are swapped (e.g. switched). As shown, data from the third CB and the fourth CB of the TB are rate-matched, beginning at 960, to the first layer(s) 902 (for transmission by TRP0) of the retransmission. Data from the first CB and the second CB of the TB are rate-matched, beginning at 970, to the second layers 904 (for transmission by TRP1) of the retransmission.

Figure 10:
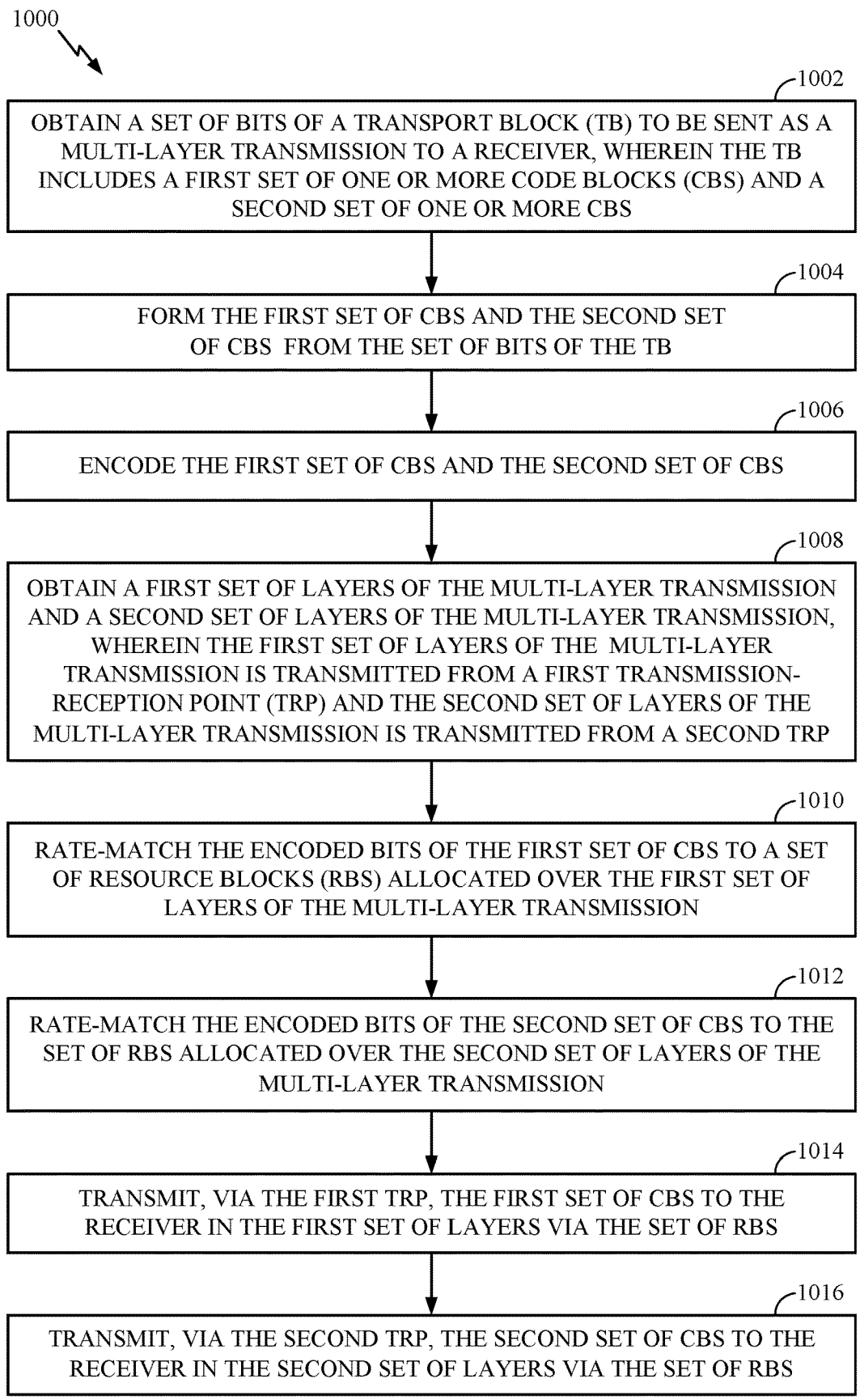
FIG. 10 shows operations for wireless communications by a transmitter, according to aspects of the present disclosure.

FIG. 10 illustrates operations 1000 for wireless communications by a transmitter, according to aspects of the present disclosure. The operations may be performed, for example, by BS 110a, UE 120, TRP 208, AN 206, or NG-CN 204, according to aspects of the present disclosure.

Operations 1000 begin at block 1002 with the transmitter obtaining a set of bits of a transport block (TB) to be sent as a multi-layer transmission to a receiver, wherein the TB includes a first set of one or more code blocks (CBs) and a second set of one or more CBs. For example, AN 206 (see FIG. 2) obtains a set of bits of a TB to be sent as a multi-layer transmission to UE 120 (see FIG. 1), wherein the TB includes a first set of one or more CBs and a second set of one or more CBs.

At block 1004, operations 1000 continue with the transmitter forming the first set of CBs and the second set of CBs from the set of bits of the TB. Continuing the example from above, AN 206 forms the first set of CBs and the second set of CBs from the set of bits of the TB by segmenting the set of bits (i.e., the set of bits obtained by the AN in block 1002) into the first set of CBs and the second set of CBs.

Operations 1000 continue at block 1006 with the transmitter encoding the first set of CBs and the second set of CBs. Continuing the example from above, the AN 206 encodes the first set of CBs (i.e., the first set formed by the AN in block 1004) and the second set of CBs (i.e., the second set formed by the AN in block 1004).

At block 1008, operations 1000 continue with the transmitter obtaining a first set of layers of the multi-layer transmission and a second set of layers of the multi-layer transmission, wherein the first set of layers of the multi-layer transmission is transmitted from a first transmission-reception point (TRP) and the second set of layers of the multi-layer transmission is transmitted from a second TRP. Continuing the example from above, the AN 206 obtains a first set of layers (e.g., from an assignment of transmission resources made by a scheduler in the AN) of the multi-layer transmission and a second set of layers of the multi-layer transmission, wherein the first set of layers of the multi-layer transmission is transmitted from TRP 208a (see FIG. 2) and the second set of layers of the multi-layer transmission is transmitted from TRP 208b (see FIG. 2).

Operations 1000 continue at block 1010 with the transmitter rate-matching the encoded bits of the first set of CBs to a set of resource blocks (RBs) allocated over the first set of layers of the multi-layer transmission. Continuing the example from above, the AN 206 rate-matches the encoded bits of the first set of CBs (i.e., the encoded bits of the first set of CBs in block 1006) to a set of RBs allocated (e.g., allocated by a scheduler in the AN) over the first set of layers (i.e., the first set of layers obtained by the AN in block 1008) of the multi-layer transmission.

At block 1012, operation 1000 continue with the transmitter rate-matching the encoded bits of the second set of CBs to the set of RBs allocated over the second set of layers of the multi-layer transmission. Continuing the example from above, the AN 206 rate-matches the encoded bits of the second set of CBs (i.e., the encoded bits of the second set of CBs in block 1006) to a set of RBs allocated (e.g., allocated by a scheduler in the AN) over the second set of layers (i.e., the second set of layers obtained by the AN in block 1008) of the multi-layer transmission.

Operations 1000 continue at block 1014 with the transmitter transmitting, via the first TRP, the first set of CBs to the receiver in the first set of layers via the set of RBs. Continuing the example from above, the AN 206 transmits, via TRP 208a, the first set of CBs (i.e., the encoded bits of the first set of CBs in block 1006) to the UE 120 in the first set of layers (i.e., the first set of layers obtained by the AN in block 1008) via the set of RBs (i.e., the RBs mentioned in blocks 1010 and 1012).

At block 1016, operations 1000 continue with the transmitter transmitting, via the second TRP, the second set of CBs to the receiver in the second set of layers via the set of RBs. Continuing the example from above, the AN 206 transmits, via TRP 208b, the second set of CBs (i.e., the encoded bits of the second set of CBs in block 1006) to the UE 120 in the second set of layers (i.e., the second set of layers obtained by the AN in block 1008) via the set of RBs (i.e., the RBs mentioned in blocks 1010 and 1012).

In aspects of the present disclosure, forming the first set of CBs and the second set of CBs from the set of bits of the TB (i.e., as described above in block 1004) may comprise segmenting the bits of the TB into the first and second sets of CBs.

According to aspects of the present disclosure, forming the first set of CBs and the second set of CBs from the set of bits of the TB (i.e., as described above in block 1004) may comprise including some bits of the TB in both the first set of CBs and the second set of CBs. In such an aspect, the transmissions (i.e., the transmissions transmitted in blocks 1014 and 1016) may each convey some same bits of the TB and raise the reliability of the delivery of those same bits.

In aspects of the present disclosure, forming the first set of CBs and the second set of CBs from the set of bits of the TB (i.e., as described above in block 1004) may comprise including all of the bits of the TB in each set of CBs. In such a case, the transmissions (i.e., the transmissions transmitted in blocks 1014 and 1016) may each convey all of the bits of the TB and raise the reliability of the communication.

According to aspects of the present disclosure, CBs of a multi-TRP transmission (e.g., the multi-TRP transmission described above with reference to FIG. 10) may be grouped into one or more code block groups (CBGs). The CBGs may be acknowledged or negatively acknowledged (e.g., ACK/NAK) by a receiver, rather than the receiver acknowledging or negatively acknowledging each CB of the transmission.

In aspects of the present disclosure, acknowledgment and negative acknowledgment of CBGs may be configured for a single DCI multi-TRP transmission, and the communications system may prevent rate-matching of each CBG from crossing a TRP boundary. That is, the communications system may cause a CBG to be formed by CBs transmitted from one TRP, but not CBs transmitted by multiple TRPs.

According to aspects of the present disclosure, a communications system may use RRC signaling to configure an equal number of CBGs of a TB for transmission by each TRP transmitting a layer of the multi-TRP transmission.

In aspects of the present disclosure, a CBG transmission indicator (CBGTI) may be indicated in DCI. A CBGTI may be a bitmap indicating which CBGs of a group of CBGs are to be transmitted in the resources allocated by the DCI.

According to aspects of the present disclosure, a CBG flushing indicator (CBGFI) may be indicated in DCI. A CBGFI may be a bitmap indicating that a receiver of the transmission allocated by the DCI should flush memory locations associated with the CBGs indicated in the CBGFI. The receiver may then receive and attempt to decode the indicated CBGs without referring to previous transmissions, which may have experienced severe interference.

In aspects of the present disclosure, a transmitter may finish (e.g., transmit and receive an acknowledgment of) the CBGs from one TRP, and in a retransmission, transmit the remaining CBGs (that were not acknowledged) and not the acknowledged CBGs. For example, when performing a multi-TRP transmission, one of the TRPs is stronger than the others (e.g., has a higher SNR to the receiver). In the example, because there is one DCI scheduling the multi-TRP transmission, the communications system cannot transmit with different MCS from the TRPs, and the communications system cannot separately control the probability that the CBs from the two TRPs are decoded. Still in the example, a receiver may acknowledge CBGs transmitted by the stronger TRP, and then the communications system may transmit the unacknowledged CBGs via the stronger TRP, as there is no need to retransmit the CBGs that were acknowledged.

According to aspects of the present disclosure, if transmissions of CBGs from one TRP all finish (i.e., the CBGs are all acknowledged), then that TRP may serve other UEs in some manner, while the other TRPs continue to transmit the CBGs which were not acknowledged. In this case, the data of the CBGs which were not acknowledged are not sent to the TRP which finished.

In aspects of the present disclosure, if transmission of CBGs from one TRP all finish (i.e., the CBGs are all acknowledged), then the remaining CBGs (which were not acknowledged) may be sent (e.g., switched or swapped) to a stronger TRP (e.g., the TRP which finished transmission of the CBGs assigned to that TRP) for retransmission. This may allow for more efficient delivery of the remaining CBGs than having the CBGs be retransmitted by the same TRPs that originally transmitted those CBGs. In this case, the data for the CBGs which were not acknowledged is sent to other TRPs, and thus it is desirable to have high-speed data connections between the TRPs.

According to aspects of the present disclosure, if transmission of CBGs from one TRP all finish (i.e., the CBGs are all acknowledged), then some of the remaining CBGs (which were not acknowledged) may be sent (e.g., switched or swapped) to a stronger TRP for retransmission, while others of the remaining CBGs are retransmitted by the same TRP as originally transmitted those CBGs. This may allow the CBGs to be re-allocated to different TRPs for retransmissions.

In aspects of the present disclosure, during rate-matching for a multi-TRP retransmission, the rate-matching process may enforce a rule that data from a CBG is not rate-matched across a TRP boundary. That is, if a CBG would be rate-matched such that some of the data of the CBG is rate-matched to layers transmitted by a first TRP and other data of the CBG is rate-matched to layers transmitted by a second TRP, then the system starts rate-matching the CBG to the layers transmitted by the second TRP and does not rate-match any of the data of the CBG to the layers transmitted by the first TRP.

In aspects of the present disclosure, a transmitter (e.g., an AN or a TRP) may transmit an indication of switching (e.g., swapping) of CBGs between TRPs when the transmitter switches CBGs between TRPs for a retransmission. The indication of the switching may be transmitted in a DCI and/or a redundancy version (RV) identifier (RVID) of the transmission.

According to aspects of the present disclosure, the described techniques may be extended to transmissions on multiple layers by a single TRP.

In previously known techniques (e.g., NR), a single codeword may be transmitted in a rank 4 or lower transmission. If there is high correlation between antenna ports, the difference in channel quality between spatial layers can be large, but due to the transmission being a single codeword, a communications system cannot use separate rates (e.g., modulation rates) for different sets of spatial layers.

In aspects of the present disclosure, techniques similar to those described herein may be applied to a single-TRP transmission. These techniques may improve the performance of the single-TRP transmission.

According to aspects of the present disclosure, when transmitting a multi-layer transmission, a transmitter may split the spatial layers in the transmission into 2 sets, with $K_1$ and $K_2$ spatial layers respectively, and then perform rate-matching across one set of spatial layers first, then across frequencies, then across time, and then perform rate-matching across the other set of spatial layers.

In aspects of the present disclosure, when rate-matching data for a multi-layer transmission, a transmitter may enforce a rule that a code block is rate-matched to one set of spatial layers and not split across two sets of spatial layers.

According to aspects of the present disclosure, a transmitter may indicate a spatial layer grouping to a receiver.

In aspects of the present disclosure, an indication of a spatial layer grouping may be transmitted in a DCI. A new field or an alteration of a previously known field may convey the indication of the spatial layer grouping.

According to aspects of the present disclosure, an indication of a spatial layer grouping may be transmitted in RRC signaling. The RRC signaling may indicate a preconfigured (i.e., configured before the multi-layer transmission) split as a function of a total rank of a multi-layer transmission.

In aspects of the present disclosure, an indication of a spatial layer grouping may be predefined in a network communications standard. For example, spatial layers can be equally split between two sets, as is done in LTE.

According to aspects of the present disclosure, when rate-matching data for a multi-layer transmission, a transmitter may enforce a rule that a code block group is rate-matched to one set of spatial layers and not split across two sets of spatial layers.

Figure 11:
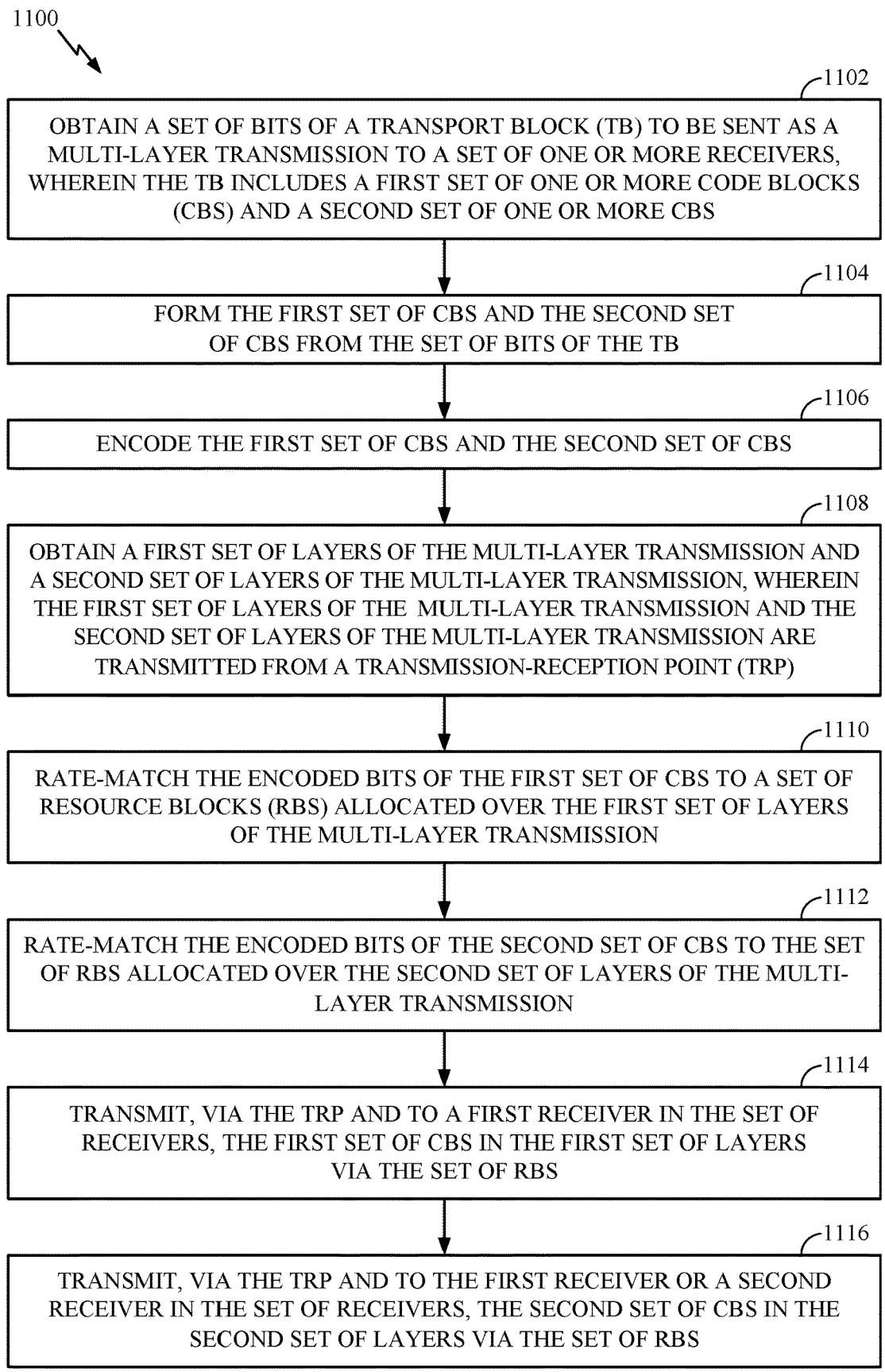
FIG. 11 shows operations for wireless communications by a transmitter, according to aspects of the present disclosure.

FIG. 11 illustrates operations 1100 for wireless communications by a transmitter, according to aspects of the present disclosure. The operations may be performed, for example, by BS 110a, UE 120, TRP 208, AN 206, or NG-CN 204, according to aspects of the present disclosure.

Operations 1100 begin at block 1102 with the transmitter obtaining a set of bits of a transport block (TB) to be sent as a multi-layer transmission to a set of one or more receivers, wherein the TB includes a first set of one or more code blocks (CBs) and a second set of one or more CBs. For example, AN 206 (see FIG. 2) obtains a set of bits of a TB to be sent as a multi-layer transmission to UEs 120 (see FIG. 1), wherein the TB includes a first set of one or more CBs and a second set of one or more CBs.

At block 1104, operations 1100 continue with the transmitter forming the first set of CBs and the second set of CBs from the set of bits of the TB. Continuing the example from above, AN 206 forms the first set of CBs and the second set of CBs from the set of bits of the TB (i.e., the set of bits obtained by the AN in block 1102) by segmenting the set of bits into the first set of CBs and the second set of CBs.

Operations 1100 continue at block 1106 with the transmitter encoding the first set of CBs and the second set of CBs. Continuing the example from above, the AN 206 encodes the first set of CBs (i.e., the first set formed by the AN in block 1104) and the second set of CBs (i.e., the second set formed by the AN in block 1104).

At block 1108, operations 1100 continue with the transmitter obtaining a first set of layers of the multi-layer transmission and a second set of layers of the multi-layer transmission, wherein the first set of layers of the multi-layer transmission and the second set of layers of the multi-layer transmission are transmitted from a transmission-reception point (TRP). Continuing the example from above, the AN 206 obtains a first set of layers (e.g., from an assignment of transmission resources made by a scheduler in the AN) of the multi-layer transmission and a second set of layers of the multi-layer transmission, wherein the first set of layers of the multi-layer transmission and the second set of layers of the multi-layer transmission are transmitted from TRP 208a (see FIG. 2).

Operations 1100 continue at block 1110 with the transmitter rate-matching the encoded bits of the first set of CBs to a set of resource blocks (RBs) allocated over the first set of layers of the multi-layer transmission. Continuing the example from above, the AN 206 rate-matches the encoded bits of the first set of CBs (i.e., the encoded bits of the first set of CBs in block 1106) to a set of RBs allocated (e.g., allocated by a scheduler in the AN) over the first set of layers (i.e., the first set of layers obtained by the AN in block 1108) of the multi-layer transmission.

At block 1112, operations 1100 continue with the transmitter rate-matching the encoded bits of the second set of CBs to the set of RBs allocated over the second set of layers of the multi-layer transmission. Continuing the example from above, the AN 206 rate-matches the encoded bits of the second set of CBs (i.e., the encoded bits of the second set of CBs in block 1106) to the set of RBs allocated (e.g., allocated by a scheduler in the AN) over the second set of layers (i.e., the second set of layers obtained by the AN in block 1108) of the multi-layer transmission.

Operations 1100 continue at block 1114 with the transmitter transmitting, via the TRP and to a first receiver in the set of receivers, the first set of CBs in the first set of layers via the set of RBs. Continuing the example from above, the AN 206 transmits, via TRP 208a and to a first UE 120 in the set of UEs 120, the first set of CBs (i.e., the encoded bits of the first set of CBs in block 1106) in the first set of layers (i.e., the first set of layers obtained by the AN in block 1108) via the set of RBs (i.e., the RBs mentioned in blocks 1110 and 1112).

At block 1116, operations 1100 continue with the transmitter transmitting, via the TRP and to the first receiver or a second receiver in the set of receivers, the second set of CBs in the second set of layers via the set of RBs. Continuing the example from above, the AN 206 transmits, via TRP 208a and to the first UE 120 or a second UE 120 in the set of UEs 120, the second set of CBs (i.e., the encoded bits of the second set of CBs in block 1106) in the second set of layers (i.e., the second set of layers obtained by the AN in block 1108) via the set of RBs (i.e., the RBs mentioned in blocks 1110 and 1112).

In aspects of the present disclosure, forming the first set of CBs and the second set of CBs from the set of bits of the TB (i.e., as described above in block 1104) may comprise segmenting the bits of the TB into the first and second sets of CBs.

According to aspects of the present disclosure, forming the first set of CBs and the second set of CBs from the set of bits of the TB (i.e., as described above in block 1104) may comprise including some bits of the TB in both the first set of CBs and the second set of CBs. In such an aspect, the transmissions (i.e., the transmissions transmitted in blocks 1114 and 1116) may each convey some same bits of the TB and raise the reliability of the delivery of those same bits.

In aspects of the present disclosure, forming the first set of CBs and the second set of CBs from the set of bits of the TB (i.e., as described above in block 1104) may comprise including all of the bits of the TB in each set of CBs. In such a case, the transmissions (i.e., the transmissions transmitted in blocks 1114 and 1116) may each convey all of the bits of the TB and raise the reliability of the communication.

Figure 12:
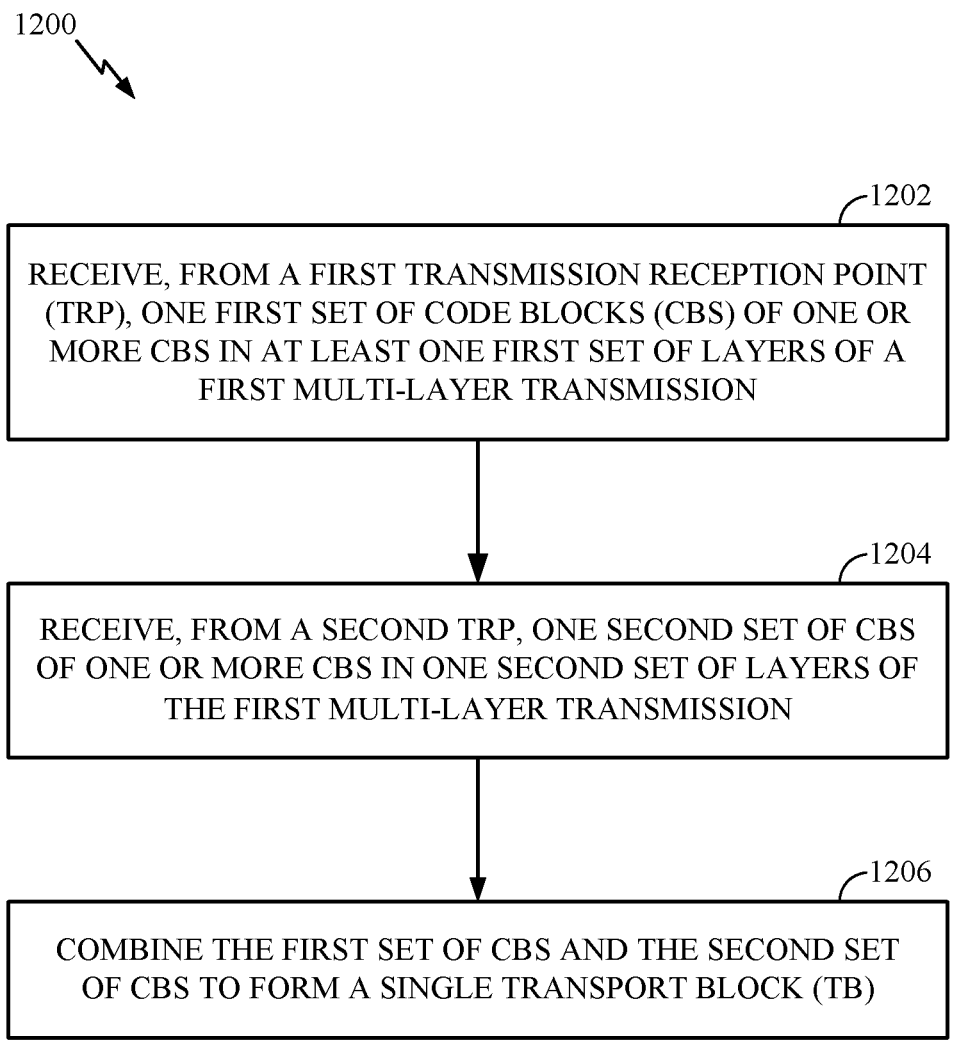
FIG. 12 shows operations for wireless communications by a receiver, according to aspects of the present disclosure.

FIG. 12 illustrates operations 1200 for wireless communications by a receiver, according to aspects of the present disclosure. The operations may be performed, for example, BS 110a, UE 120, TRP 208, AN 206, or NG-CN 204 and may be complimentary to operations 1000 (see FIG. 10) or operations 1100 (see FIG. 11), according to aspects of the present disclosure.

Operations 1200 begin at block 1202 with the receiver receiving, from a first transmission reception point (TRP), one first set of code blocks (CBs) of one or more CBs in at least one first set of layers of a first multi-layer transmission. For example, UE 120 (see FIG. 1) receives, from TRP 208a (see FIG. 2), one first set of CBs of one or more CBs in a first set of layers of a first multi-layer transmission.

At block 1204, operations 1200 continue with the receiver receiving, from a second TRP, one second set of CBs of one or more CBs in one second set of layers of the first multi-layer transmission. Continuing the example from above, UE 120 receives, from TRP 208b (see FIG. 2), one second set of CBs of one or more CBs in a second set of layers of the first multi-layer transmission (i.e., the multi-layer transmission mentioned in block 1202).

Operations 1200 continue at block 1206 with the receiver combining the first set of CBs and the second set of CBs to form a single transport block (TB). Continuing the example from above, UE 120 combines the first set of CBs (i.e., the CBs received from TRP 208a in block 1202) and the second set of CBs (i.e., the CBs received from TRP 208b in block 1204) to form a single TB.

Figure 13:
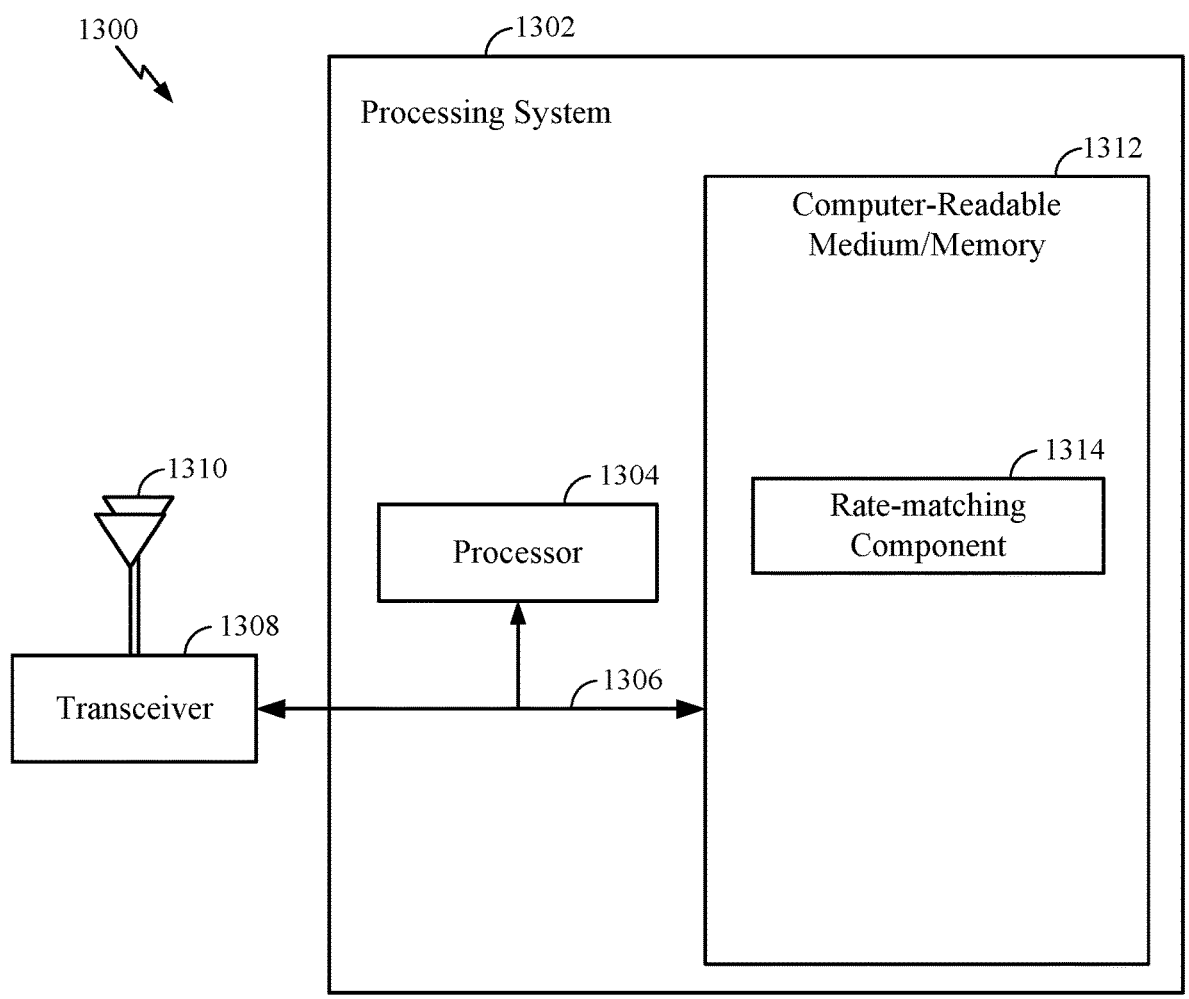
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIGS. 8-12. The communications device 1300 includes a processing system 1302 coupled to a transceiver 1308. The transceiver 1308 is configured to transmit and receive signals for the communications device 1300 via a plurality of antennas 1310, such as the various signals described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions that when executed by processor 1304, cause the processor 1304 to perform the operations illustrated in FIGS. 8-12, or other operations for performing the various techniques discussed herein.

In certain aspects, the processing system 1302 further includes a rate-matching component 1314 for performing the operations illustrated in FIGS. 8-12. The rate-matching component 1314 may be coupled to the processor 1304 via bus 1306. In certain aspects, the rate-matching component 1314 may be a hardware circuit. In certain aspects, the rate-matching component 1314 may be a software component that is executed and run on processor 1304.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein. For example, instructions for performing the operations described herein and illustrated in FIGS. 8-12 may be included in computer-readable medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications performed by a transmitter, comprising:
   obtaining a set of bits of a transport block (TB) to be sent as a multi-layer transmission to a receiver, wherein the TB includes a first set of code blocks (CBs) and a second set of CBs;
   forming the first set of CBs and the second set of CBs from the set of bits of the TB;
   encoding the first set of CBs and the second set of CBs;
   obtaining a first set of layers of the multi-layer transmission and a second set of layers of the multi-layer transmission, wherein the first set of layers of the multi-layer transmission is transmitted from a first transmission-reception point (TRP) and the second set of layers of the multi-layer transmission is transmitted from a second TRP, wherein each CB of the TB is transmitted by a single TRP;
   rate-matching the encoded bits of the first set of CBs to a set of resource blocks (RBs) allocated over the first set of layers of the multi-layer transmission;
   rate-matching the encoded bits of the second set of CBs to the set of RBs allocated over the second set of layers of the multi-layer transmission;
   transmitting, via the first TRP, the first set of CBs to the receiver in the first set of layers via the set of RBs; and
   transmitting, via the second TRP, the second set of CBs to the receiver in the second set of layers via the set of RBs.

2. The method of claim 1, further comprising:
   transmitting downlink control information (DCI) allocating the set of RBs for the multi-layer transmission, wherein the DCI indicates the first set of layers and the second set of layers.

3. The method of claim 1, further comprising:
   determining a first sub-TB size, based on a number of RBs in the set of RBs, a modulation and coding scheme (MCS), and a number of layers in the first set of layers of the multi-layer transmission; and
   determining a second sub-TB size, based on the number of RBs in the set of RBs, the MCS or another MCS, and a number of layers in the second set of layers of the multi-layer transmission, wherein forming the first set of CBs and the second set of CBs comprises:
   requesting the first sub-TB size number of bits from a medium access control (MAC) layer of a protocol stack of the first TRP,
   requesting the second sub-TB size number of bits from a MAC layer of a protocol stack of the second TRP,
   segmenting the first sub-TB size number of bits provided from the MAC layer into the first set of CBs, and
   segmenting the second sub-TB size number of bits provided from the MAC layer into the second set of CBs.

4. The method of claim 1, further comprising:
   coordinating transmitting the first set of layers via the first TRP to the receiver with transmitting the second set of layers via the second TRP to the receiver.

5. The method of claim 1, wherein transmitting the first set of CBs in the first set of layers to the receiver comprises transmitting the first set of CBs using a different modulation order than another modulation order used in transmitting the second set of CBs in the second set of layers.

6. The method of claim 1, further comprising:
   swapping the first set of CBs and the second set of CBs for different retransmissions of the TB, wherein the swapping comprises:
   transmitting the first set of CBs from the second TRP, and
   transmitting the second set of CBs from the first TRP.

7. The method of claim 6, further comprising:
   transmitting an indication of the swapping, wherein the indication comprises at least one of: downlink control information (DCI) or a redundancy version (RV) identifier (RVID).

8. The method of claim 1, further comprising:
   forming two or more code block groups (CBGs) from the first set of CBs;
   receiving, from the receiver, a negative acknowledgment (NAK) of a first subset of CBGs of the two or more CBGs and an acknowledgment (ACK) of a second subset of CBGs of the two or more CBGs; and
   retransmitting the first subset of CBGs to the receiver.

9. The method of claim 1, further comprising:
   forming two or more code block groups (CBGs) from the second set of CBs;
   receiving, from the receiver, a negative acknowledgment (NAK) of a third subset of CBGs of the two or more CBGs and an acknowledgment (ACK) of a fourth subset of CBGs of the two or more CBGs; and
   retransmitting the third subset of CBGs to the receiver.

10. The method of claim 1, further comprising:
    forming two or more first code block groups (CBGs) from the first set of CBs;
    forming two or more second code block groups (CBGs) from the second set of CBs;
    receiving, from the receiver, a negative acknowledgment (NAK) of a first subset of CBGs of the two or more first CBGs;
    receiving, from the receiver, an acknowledgment (ACK) of the second CBGs; and
    retransmitting, via the first TRP or the second TRP, the first subset of the first CBGs.

11. A method of wireless communications performed by a receiver, comprising:
    receiving, from a first transmission reception point (TRP), one first set of code blocks (CBs) of one or more CBs in at least one first set of layers of a first multi-layer transmission;

receiving, from a second TRP, one second set of CBs of the one or more CBs in one second set of layers of the first multi-layer transmission; and combining the first set of CBs and the second set of CBs to form a single transport block (TB), wherein each CB of the TB is received via a single TRP.

12. The method of claim 11, further comprising:
receiving downlink control information (DCI) allocating a set of resource blocks (RBs) for the first multi-layer transmission, wherein the DCI indicates the first set of layers and the second set of layers.

13. The method of claim 11, wherein:
receiving the first set of CBs in the first set of layers is based on a first modulation order; and
receiving the second set of CBs in the second set of layers is based on a second modulation order.

14. The method of claim 13, wherein the second modulation order is different from the first modulation order.

15. The method of claim 11, further comprising:
transmitting a negative acknowledgment (NAK) for the first set of CBs; and
receiving, from the second TRP, the first set of CBs in a second multi-layer transmission.

16. An apparatus for wireless communications, comprising:
a processor configured to:
obtain a set of bits of a transport block (TB) to be sent as a multi-layer transmission to a receiver, wherein the TB includes a first set of code blocks (CBs) and a second set of CBs;
form the first set of CBs and the second set of CBs from the set of bits of the TB;
encode the first set of CBs and the second set of CBs;
obtain a first set of layers of the multi-layer transmission and a second set of layers of the multi-layer transmission, wherein the first set of layers of the multi-layer transmission is transmitted from a first transmission-reception point (TRP) and the second set of layers of the multi-layer transmission is transmitted from a second TRP, wherein each CB of the TB is transmitted by a single TRP;
rate-match the encoded bits of the first set of CBs to a set of resource blocks (RBs) allocated over the first set of layers of the multi-layer transmission;
rate-match the encoded bits of the second set of CBs to the set of RBs allocated over the second set of layers of the multi-layer transmission;
transmit, via the first TRP, the first set of CBs to the receiver in the first set of layers via the set of RBs; and
transmit, via the second TRP, the second set of CBs to the receiver in the second set of layers via the set of RBs; and
a memory coupled with the processor.

17. The apparatus of claim 16, wherein the processor is further configured to:
transmit downlink control information (DCI) allocating the set of RBs for the multi-layer transmission, wherein the DCI indicates the first set of layers and the second set of layers.

18. The apparatus of claim 16, wherein the processor is further configured to:
determine a first sub-TB size, based on a number of RBs in the set of RBs, a modulation and coding scheme (MCS), and a number of layers in the first set of layers of the multi-layer transmission; and
determine a second sub-TB size, based on the number of RBs in the set of RBs, the MCS or another MCS, and a number of layers in the second set of layers of the multi-layer transmission, wherein forming the first set of CBs and the second set of CBs comprises:
request the first sub-TB size number of bits from a medium access control (MAC) layer of a protocol stack of the first TRP,
request the second sub-TB size number of bits from a MAC layer of a protocol stack of the second TRP,
segment the first sub-TB size number of bits provided from the MAC layer into the first set of CBs, and
segment the second sub-TB size number of bits provided from the MAC layer into the second set of CBs.

19. The apparatus of claim 16, wherein the processor is further configured to:
coordinate transmitting the first set of layers via the first TRP to the receiver with transmitting the second set of layers via the second TRP to the receiver.

20. The apparatus of claim 16, wherein the processor is configured to transmit the first set of CBs in the first set of layers to the receiver by transmitting the first set of CBs using a different modulation order than another modulation order used in transmitting the second set of CBs in the second set of layers.

21. The apparatus of claim 16, wherein the processor is further configured to:
swap the first set of CBs and the second set of CBs for different retransmissions of the TB, wherein the processor is configured to swap the first set of CBs and the second set of CBs by:
transmitting the first set of CBs from the second TRP, and transmitting the second set of CBs from the first TRP.

22. The apparatus of claim 16, wherein the processor is further configured to:
form two or more code block groups (CBGs) from the first set of CBs;
receive, from the receiver, a negative acknowledgment (NAK) of a first subset of CBGs of the two or more CBGs and an acknowledgment (ACK) of a second subset of CBGs of the two or more CBGs; and
retransmit the first subset of CBGs to the receiver.

23. The apparatus of claim 16, wherein the processor is further configured to:
form two or more code block groups (CBGs) from the second set of CBs;
receive, from the receiver, a negative acknowledgment (NAK) of a third subset of CBGs of the two or more CBGs and an acknowledgment (ACK) of a fourth subset of CBGs of the two or more CBGs; and
retransmit the third subset of CBGs to the receiver.

24. The apparatus of claim 16, wherein the processor is further configured to:
form two or more first code block groups (CBGs) from the first set of CBs;
form two or more second code block groups (CBGs) from the second set of CBs;
receive, from the receiver, a negative acknowledgment (NAK) of a first subset of CBGs of the two or more first CBGs;
receive, from the receiver, an acknowledgment (ACK) of the second CBGs; and
retransmit, via the first TRP or the second TRP, the first subset of the first CBGs.

25. An apparatus of wireless communications, comprising:

a processor configured to:
> receive, from a first transmission reception point (TRP), one first set of code blocks (CBs) of one or more CBs in at least one first set of layers of a first multi-layer transmission;
> receive, from a second TRP, one second set of CBs of the one or more CBs in one second set of layers of the first multi-layer transmission; and
> combine the first set of CBs and the second set of CBs to form a single transport block (TB), wherein each CB of the TB is received via a single TRP; and a memory coupled with the processor.

26. The apparatus of claim 25, wherein the processor is further configured to:
> receive downlink control information (DCI) allocating a set of resource blocks (RBs) for the first multi-layer transmission, wherein the DCI indicates the first set of layers and the second set of layers.

27. The apparatus of claim 25, wherein:
the first set of CBs are received in the first set of layers based on a first modulation order; and
the second set of CBs are received in the second set of layers based on a second modulation order.

28. The apparatus of claim 27, wherein the second modulation order is different from the first modulation order.

29. The apparatus of claim 25, wherein the processor is further configured to:
> transmit a negative acknowledgment (NAK) for the first set of CBs; and
> receive, from the second TRP, the first set of CBs in a second multi-layer transmission.

* * * * *